March 26, 1963 J. VICKERY 3,082,870
COMBINED PACKAGE AND DISPENSER OF PLASTIC WRAPPING FILM
Filed March 7, 1960 3 Sheets-Sheet 1
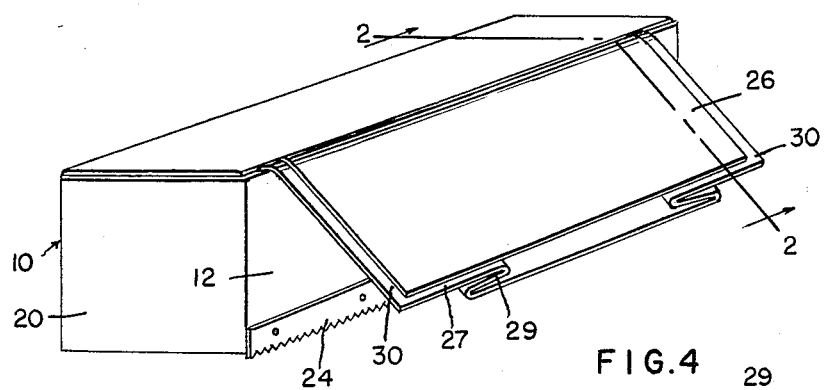
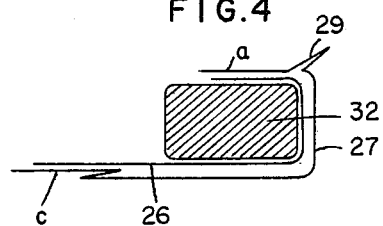
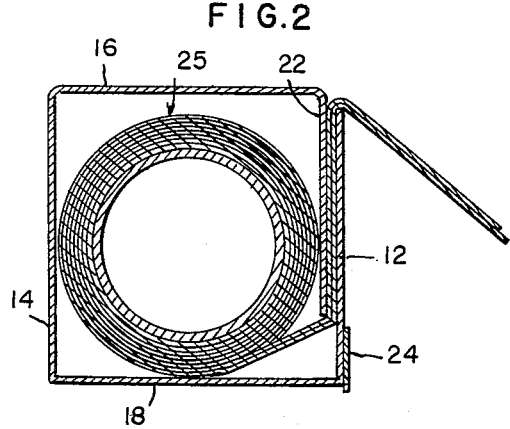
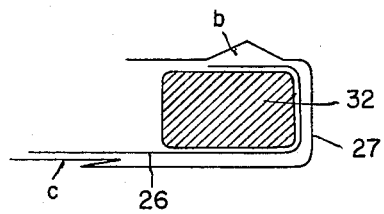
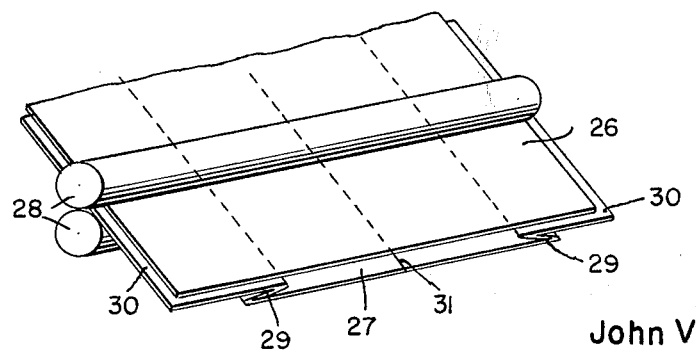
INVENTOR
John Vickery
BY *Shoemaker and Mattare*
ATTORNEYS March 26, 1963 J. VICKERY 3,082,870
COMBINED PACKAGE AND DISPENSER OF PLASTIC WRAPPING FILM
Filed March 7, 1960 3 Sheets-Sheet 2
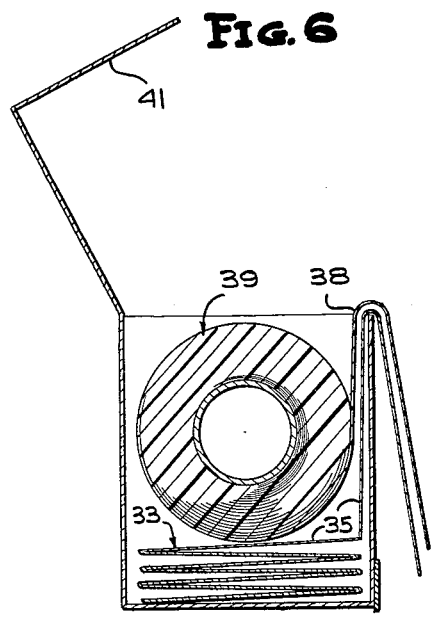
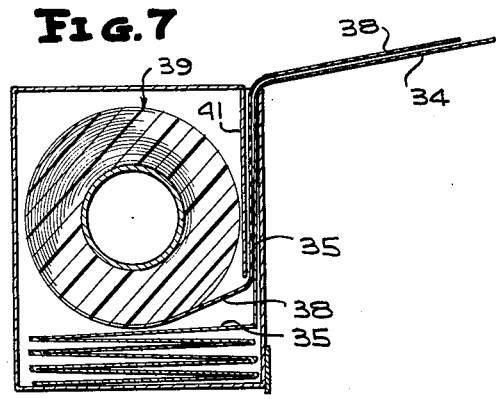
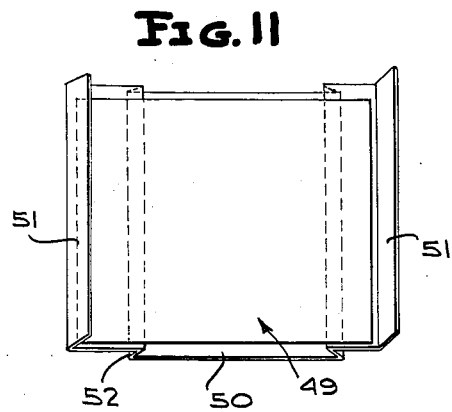
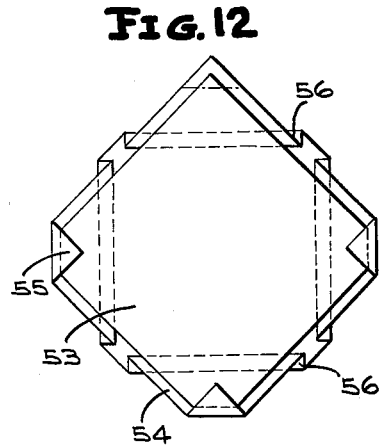
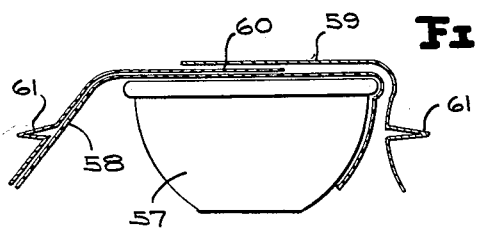
INVENTOR.
JOHN VICKERY
BY
Shoemaker and Mattare
ATTORNEYS March 26, 1963 J. VICKERY 3,082,870
COMBINED PACKAGE AND DISPENSER OF PLASTIC WRAPPING FILM
Filed March 7, 1960 3 Sheets-Sheet 3

INVENTOR
John Vickery

BY *Shoemaker and Mattare*
ATTORNEYS

United States Patent Office 3,082,870
Patented Mar. 26, 1963

3,082,870
COMBINED PACKAGE AND DISPENSER OF
PLASTIC WRAPPING FILM
John Vickery, R.D. 1, Califon, N.J.
Filed Mar. 7, 1960, Ser. No. 13,182
8 Claims. (Cl. 206—58)

This invention relates broadly to the handling of various types of films, sheets, webs and the like which may be employed for wrapping articles to protect or preserve the same.

One type of wrapping material which is now extensively used is in the nature of a film of material such as plastic which, by reason of the treatment to which it has been subjected in its manufacture, or subsequent thereto, has the facility of clinging very closely to the object on which it may be placed. This facility is very valuable in the fact that it forms an air excluding seal with the body, thereby preserving the latter, or protecting the body or the contents of a receptacle over and around which the film is placed, from contamination or from altering chemically as a result of contact with the air.

The advantageous quality of such a film also is to some extent a disadvantage in the fact that it makes the film difficult to handle because when a portion of the film is separated from a roll thereof it has a tendency to curl and stick to itself and it is then very difficult to open out so that it can be put to the desired use.

It is a particular object of the present invention in view of the foregoing to provide a new and novel method and means of handling a film of the type referred to so that the annoying tendency of the same to cling to itself or to objects other than the one about which it is to be placed, can be controlled, thereby making it possible to use the film with greater convenience.

The self-clinging films and other types of wrapping material marketed in the form of foils or sheets are sold in roll form and in cartons constructed to facilitate the cutting of tearing off of a desired length of the material when it is drawn from the carton. However, unless the foil, film or other sheet material is carefully handled after being drawn out of the carton, it may be torn in a way other than that desired and, therefore, it is another object of the present invention to provide a means associated with the foil, film or sheet, for supporting the latter in such a way as to facilitate the accurate cutting of tearing off of a desired section thereof.

More particularly, with regard to the foregoing, it is an object of the present invention to provide as a new combination, a roll of such material with a supporting or protective sheet located within the carton in which the wrapping material is merchandised, in such a way that the protective sheet and the film can be extracted together from the carton and torn off together.

A further advantage in providing a wrapping material with a protective sheet in the manner stated resides in having the protective sheet function, if desired, as an additional wrapper with the wrapping material, particularly in the case of materials packages for sale in the store, such as cheeses or other foodstuffs, where the protective sheet material may carry trademark and other advertising material and serve to preserve the cleanliness of the foil, film or other material in contact with the foodstuff so that after the foodstuff is taken into the home and the outside wrapper removed, the film or foil may be further employed to protect the material while it is in the refrigerator with the assurance that the exterior surface thereof is clean or uncontaminated.

It is a further object of the present invention to provide a wrapping material such as the hereinbefore referred-to self-adhering plastic film, with a protective sheet which is creased or folded in a novel manner whereby, while the protective sheet will be held in position against one side of the film by reason of the facility of that film to cling to whatever it touches, the protective sheet can be readily separated from the film by the application of a pull to the sheet in such a way as to open up the crease or fold to form an air pocket between the latter and the film, which air pocket facilitates the separation of the two bodies.

Other objects and advantages of the invention will become apparent as the description of the same proceeds and the invention will be best understood from a consideration of the following detail description taken in connection with the accompanying drawings forming part of the specification, wtih the understanding, however, that the invention is not confined to a strict conformity with the showing of the drawings but may be changed or modified so long as such changes or modifications mark no material departure from the salient features of the invention as expressed in the appended claims.

In the drawings:

FIG. 1 is a view in perspective of a conventional type of dispensing carton in which is marketed a well known self-adhering plastic film and illustrates in association therewith the present invention in one form or embodiment wherein the protective sheet is rolled in with the wrapping film;

FIG. 2 is a sectional view taken substantially on the line 2—2 of FIG. 1 and on an enlarged scale;

FIG. 3 is a diagrammatic view illustrating a way in which the self-adhering film and the folded protective sheet might be rolled together to effect the adherence of one to the other preparatory to rolling the sheets on a cylinder;

FIG. 4 is a diagrammatic view illustrating a manner of using a section of the wrapping film and protective sheet, showing the first stage in the operation of using the same in wrapping a body;

FIG. 5 is a diagrammatic view corresponding to FIG. 4 and illustrating a second stage in the operation of wrapping the body;

FIG. 6 is a diagrammatic cross sectional view of the carton, roll and protective sheet after the roll has been placed in the carton and the latter is ready to be closed;

FIG. 7 is a diagrammatic view corresponding to FIG. 6 and showing the carton closed and a portion of the film and protective sheet drawn out therefrom;

FIG. 8 illustrates diagrammatically the relationship between the wrapping film and the protective sheet when the protective sheet is pulled relative to the wrapping film whereby to form the desired air pockets therebetween which facilitate the separation of the film and sheet;

Figure 9:
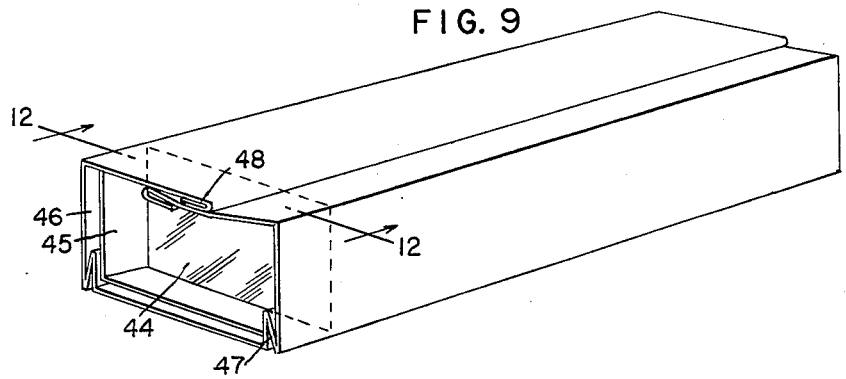
Figure 10:
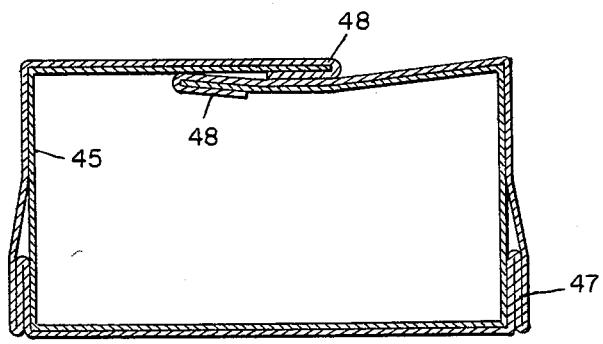

FIG. 9 is a view in perspective illustrating the manner of using preformed or pre-cut sections of wrapping film, foil or the like having applied thereto preformed and folded sections of protective sheet material in wrapping a body where the protective sheet may be employed as an advertisement carrying medium, so that the protective sheet may later be removed and the wrapping film re-used as a cover or protecting wrapper for the body;

FIG. 10 is a sectional view on an enlarged scale taken substantially on the line 12—12 of FIG. 9;

FIG. 11 is a diagrammatic view illustrating the manner of associating the wrapping film or foil with the protective sheet shown in the preceding two figures;

FIG. 12 is a diagrammatic view illustrating another way of joining together sections of wrapping film or foil or like material and a protective sheet of paper or the like;

FIG. 13 illustrates a method according to the present invention of top-wrapping a container of liquid or other material with a preformed section of the film or foil and the protective sheet or backing and wherein such protective sheet or backing may be perforated or in two overlapping sections;

Referring now more particularly to the drawings, reference will first be made to FIGS. 1 to 5 wherein the basic principle of the present invention is illustrated, which shows one method of combining a protective sheet of material with a wrapping material of the type comprising a film which is formed to cling to a body about which it may be placed.

In FIGS. 1 and 2 a means is illustrated of combining with the film wrap a protective sheet in accordance with the primary concept of the invention. In these figures the numeral 10 generally designates a carton of the type in which plastic film is marketed in a roll form and wherein a means is provided on the carton to facilitate tearing off a section of the film to be used. As here shown the carton comprises the conventional longitudinal front, back, top and bottom walls 12, 14, 16 and 18 respectively, and the end walls 20, one only of which is shown. The top wall is formed integral with a tongue 22 which in the use of the carton for dispensing is turned inwardly in the well known manner and upon the outer side of the front wall 12 there is fixed along the bottom edge the serrated strip 24 which is utilized as a cutting means.

In the application of the invention to film wraps having the characteristic of clinging to the body about which the wrap is placed, the invention rests to a certain degree upon the utilization of this clinging property of the film wrap to effect a temporary frictional bonding of the film to a body of paper or like protective material of corresponding dimensions to the film and which protective body or sheet is formed with certain creases or folds which provide a means for breaking its bond with the film when necessary to part the protective paper or sheet from the film.

While the invention as illustrated in FIGS. 1 and 2 could be incorporated in one package for consumer marketing, it also illustrates a possible method of making practical the industrial use of the film for the wrapping and packaging of foodstuffs and other products by hand or machine.

In the association of the film wrap and the protective sheet of paper or other material the bonding of the protective sheet might be done prior to packaging of the roll which is here generally designated 25 and which shows more or less diagrammatically the film wrap material 26 and the protective sheet which is bonded thereto and which is designated 27.

In combining the film 26 and sheet 27, after the film has been calendered into strip form, it might be fed between pressure rollers 28, as illustrated diagrammatically in FIG. 3, together with a corresponding but slightly wider length or strip of protective sheet material 27.

The sheet 27 would be provided with at least two folded pleats 29 extending lengthwise thereof with the overlap of the pleats upon the underside or under surface. Thus when the two sheets of material 26 and 27 are combined in roll form the pleats 29 will be rolled in lengthwise of the strip and due to the initial selection of the sheet material 27 of substantially greater width than the film 26, a narrow portion of the protective sheet will remain to project at each longitudinal side of the sheet beyond the film wrap, which projecting marginal portions are designated 30.

For greater widths of the film, additional pleats 29 might be provided with or without a central longitudinal perforation line 31 to facilitate removal of the protective sheet from the film or, while such structure is not illustrated, the protective sheet 27 might be in two parts or two strips overlapping along the center of the film covering where the perforation line 31 is shown.

In combining the film and protective sheet in the manner stated, the pressure rollers operate to eliminate all air from between the two sheets of material whereby full utilization of the clinging property of the film would be made to create the desired frictional bonding together of the film and protective sheet.

The pleats on the underside of the paper or protective sheet will prevent the film from clinging completely to the opposing surface of the film when the two sheets or laminations are rolled up under tension into the roll 25 as would be the case if the protective paper sheet were smooth and unpleated. This association of the pleated protective sheet and the film thus provides for the free unrolling or withdrawal of any length of the film from the roll without tearing.

FIGS. 1 and 2 illustrate the manner in which the laminated sheets may be drawn out together from the carton and when so drawn out they can then be pulled down across the cutter bar so that the withdrawn portion can be severed from the roll and in this operation the protective sheet will provide the proper support for the film to facilitate this tearing action. Also when the desired length of film is detached from the roll the protective sheet or backing of paper stabilizes and stiffens the film, preventing it from wrinkling and folding upon itself and from clinging to other surfaces, thereby giving complete control of the film and adding to the ease of handling large sections or sheets thereof.

FIGS. 4 and 5 illustrate diagrammatically how the protective creased or pleated sheet adds to the convenience of using the film in the wrapping of an object. In these figures the numeral 32 may represent generally a body of food or food product. The laminated film and protective sheet severed from the roll is placed on a supporting surface with the protective sheet underneath and the body 32 is placed on the film 26. The sides of the paper having the plates running lengthwise are alternately and closely wrapped over the body. This brings the under-fold of the pleat of the paper to the top of the body, as shown in FIG. 4. As the film 26 will cling most tightly to a surface of the body 32 particularly if such surface is moist, its strongest adherence will now be to the body or food product. This will permit the portion $a$ between the first or top pleat and the adjacent end edge of the sheet to be slid over the film and in doing this, the folded pleat will be opened. As the pleat opens or unfolds it supplies the necessary additional width to the paper to allow this sliding motion of the paper and at the same time the unfolding of the pleat creates a widening air pocket $b$ between the film and the paper, thus providing the desired means for breaking the temporary bonding between the film 26 and the protective sheet 27, as shown in FIG. 5. The first turned-over portion of the paper may then be peeled back freely leaving the film clinging closely to the product and by then repeating this action with the other end $c$ of the sheet, together with the adjacent end portion of the film, the completion of the wrapping of the film around the body can be effected, thus leaving the film clinging closely to and around the product and the ends of the film can then be folded in to complete the wrapping.

Another manner of associating the film and protective sheet in a carton so that the two sheets can be drawn out together in a manner similar to that illustrated in FIGS. 1 and 2, is shown in FIGS. 6 and 7, with FIG. 8 illustrating how the air pockets are formed to effect the ready separation of the film and the protective sheet. In this second embodiment or version of the method of combining the roll of film with the protective sheet, a means is provided whereby the protective sheet may be incorporated into existing package designs. While it is possible to incorporate the film and sheet in the carton without changing the carton structure, where the protective sheet is of sufficient lightness or thinness, if a heavy type of protective sheet were to be employed a slight increase in the height of the carton might be found necessary.

This second embodiment of the invention contemplates the provision of the protective sheet in the form of a pad in which the paper is folded in concertina form.

FIG. 6 illustrates a pad 33 of folded paper 34 and the sections of the folds are designated 35 with the fold lines or crease lines designated 36.

The box or carton for receiving the folded paper pad is generally designated 37 and in this version of the invention the paper pad will be of corresponding length and width to the film 38, the entire roll of which is diagrammatically shown and generally designated 39. The paper forming the protective sheet 34 would correspond in length and width to the film 38 and accordingly the length of the pad which is formed by folding the sheet would also be of the same or substantially the same length as the roll and the interior of the carton.

The pad 33 might be supplied separately from the packaged roll of film, in which case upon the purchase of the carton of film, the user would open the carton, take out the roll of film and place the folded pad 33 in the carton on the bottom thereof. The top fold 35 would then be lifted and brought out of the carton to hang over the top edge of the front wall 40 of the carton, after which the roll of film is replaced in the carton as shown diagrammatically in FIG. 6, with the end thereof uppermost so that the film will unwind from the bottom and at the front side of the carton. The free end of the film would then be drawn out sufficiently to permit the carton flap 41 to be placed back into the carton in the manner illustrated diagrammatically in FIG. 7. As will be readily apparent from these last two figures, 8 and 9, the ends of the film and the protective paper sheet may be grasped and drawn out from the carton so that the two may be severed together in the desired length.

As the film and the protective paper sheet are thus pulled from the carton, the paper will unfold from beneath the roll. The tension applied by this pulling creates the desired temporary bonding between the two materials and when a length of the two sheets is detached the paper will stabilize the film, as previously described. At the same time the film prevents the paper from refolding. Thus as illustrated diagrammatically in FIG. 8, the paper will form a number of alternating ridges and valleys designated 42 and 43 respectively. While the film will thus prevent the paper from refolding, as stated, it will be seen that the alternate valley folds 43 will pull away slightly from the film, thus leaving air pockets 44. These air pockets which extend across the width of the paper and the film provide the means for facilitating the breaking away of the bond between the paper and film during the process of wrapping the film around a body in the manner hereinbefore described in connection with FIGS. 4 and 5. In this second embodiment or version of the invention use may also be made of a perforation line running the length of the paper in the center thereof which would be particularly advantageous in using the film as a covering for bowls of liquids or foodstuffs or other containers or receptacles or where making a wrapping from the top and under a body would be expedient.

The invention also contemplates the commercial wrapping and packaging in such a way that the outside and possibly shop-soiled wrapping may be discarded and the film used to rewrap any unused portion of the commodity. This feature would be particularly desirable in the case of the purchase of food products pre-cut in different weights from a larger body of the product. As one example, food stores sell different size pieces or weights of cheeses which are presented for sale already wrapped. By the use of the present invention where the wrapping film is protected by the outside protective paper sheet or wrapping, the latter could be discarded after making the purchase so that the clean inner wrapping might then be further used to protect or re-wrap any portions of the material not immediately used.

Where the laminated wrapping structure, consisting of the film and the paper backing or protective sheet, is used in this manner, the outside wrapper or paper sheet may be employed to carry printed matter, as hereinbefore stated, and such wrapper which might also be of lightweight card, would have folded pleats across its width so placed that the outer edge of the pleat would align with the bottom of the completed package. Also the outside wrapper would be slightly larger in area than the film and the width edges would be folded over the corresponding edges of the film. Reference to FIGS. 9 and 10 will show the manner in which the film and outside wrapper might be joined together for the use set forth. In these figures the reference character 44 designates the body to be wrapped and the characters 45 and 46 designate respectively the film and the outside wrapping or protective sheet of paper or light card. The film and protective sheet are preliminarily cut or formed in the desired size and they may be provided in packs ready for use in commercial establishments or for use in machines designed for high speed packaging.

As illustrated, the outside or protective sheet is of larger over-all dimensions than the film and such sheet is provided with at least two folds 47 which, when the laminated structure is wrapped around the body 44, extend along or align with the bottom of the body 44. The transverse end portions 48 of the wrapper which project beyond the adjacent transverse edges of the film would be turned under as illustrated most clearly in FIG. 10 so that these turned or folded edge portions would operate to hold the edges of the film and wrapper sheet together as a further means of stabilizing the unit or the film particularly for high speed machine packaging. Also these folded over edges 48 of the outside wrapper will hold the film to the wrapper when the package is opened, permitting the film to be peeled from the body without tearing.

It will, of course, be understood from a consideration of FIG. 9, that after the laminated structure consisting of the film and sheet is folded over in the manner shown, the projecting end portions will be folded in, in the conventional manner. After opening the package, any unused portion of the contents needed to be re-wrapped for storage can be so re-wrapped by following the hereinbefore described procedure, the folds or pleats 47 in the outside wrapper serving to permit the wrapper to be released from the film.

While reference has been made hereinbefore to the application of the invention to the handling and protecting of films or sheets of wrapping material in association with or contained in containers or receptacles from which the film and its protective sheet may be extracted and severed or cut off in desired sizes, it is to be understood that the invention in its broadest or fundamental aspect is directed to the method and means of handling and using the wrapping material, in the nature of the self-clinging plastic film. Regardless of the character or type of the self-adhering or self-clinging body of material, the concept of the invention is directed to the employment of the backing or protective sheet which has the function of acting as a stiffener of limp or difficultly handled films and to the forming of the backing or protective material in a novel manner which will facilitate its removal from the film to which it is adhered.

With regard to the use of the paper backing having pleats or folds designed to facilitate both the handling of the film material and the separation of the backing therefrom, the backing when used on the self-clinging type of film provides a certain safety factor.

The self-clinging type of film wrap is believed to owe its clinging ability to a static electrical charge which it carries. It is well known that there have been many fatalities associated with the plastic films attributable to such films getting over the face of a child while playing with the film, the character of the film causing it to closely adhere to the skin so that when it covers the face, asphyxiation results. Obviously wrapping film of the type herein referred to might conceivably cause such a tragedy but with the film bonded to a backing paper or the like in accordance with the present invention it would not be so readily available and enticing to children to play with the material and furthermore the film would tend to cling to the paper and would not be likely to adhere to a child's face.

FIGS. 11, 12 and 13 illustrate additional methods of pleating the paper protective sheet or backing for specialized wrapping whereby the film could be marketed in pre-cut sheets for sandwich and other standard size wraps. Also such pre-cut sheets of fixed size could be provided with a perforation or perforations or could be provided in two sections with overlapping edges to facilitate the top wrapping of containers.

Referring particularly to FIG. 11, there is shown a pre-cut section of wrapping foil, film or other material which is generally designated 49. Underlying this body of material is a sheet of backing paper which is generally designated 50 and which may be of approximately the same size in one dimension as the sheet 49 or slightly larger, and in the opposite dimension it is of materially greater size so that body portions 51 may be folded over the adjacent edge portions of the sheet 49 so as to join the two sheets of material together.

The backing sheet 50 is also folded to form a pair of parallel pleats 52 which are also parallel with the folded edge portions 51. These folded edge portions function to hold the two sheets together so that, as previously stated, the laminated bodies consisting of the two sheets of material 49 and 50, may be marketed in stacks or packages for various wrapping operations and additionally the folded over edge portions prevent the film 49 from lifting when a top lamination is removed or from curling as such film would do if not secured in the manner described.

FIG. 12 illustrates still another way of joining together a plastic film, or other sheet or film of wrapping material. Here the wrapping film is designated 53 and the backing sheet or protective sheet is designated 54. In this illustration the backing sheet is all over of larger dimensions than the film 53 and the two sheets are connected together by folding over a portion of each of the corners of the backing sheet as indicated at 55 so that such folded over corner portion will lie upon the top of the film. Also in order to facilitate the parting or separation of the backing sheet from the film pleats 56 may be formed therein on lines extending across the corners thereby forming the four pleats shown.

In FIG. 13 there is illustrated an arrangement in which a pre-cut section of wrapping film or foil is bonded to a backing sheet so that the film may be used to close the top of a receptacle such as the bowl 57. In this illustration the film is diagrammatically drawn and is designated 58, and the backing material is comprised of two sheets of paper each of which is designated 59, which have portions in overlapping relation as indicated at 60. Each of the sheets is also provided with a pleat 61 similar to the pleats hereinbefore referred to. It will be seen here that the film when bonded to a single or a two-part backing sheet may be placed over the top of the receptacle and pressed or molded down and around against the wall of the receptacle without difficulty since the pressure of the hands will be applied primarily to the protective sheet so that the film will be caused to quickly adhere to the bowl or receptacle after which the protective sheet can be removed by stripping the two sections away from the film, the pleats 61 opening out in the manner hereinbefore described to facilitate the ready separation of the same from the film.

Where the sheet may be provided in a single piece instead of two pieces, as shown, the paper between the pleats would be perforated so that separation of the sheet could more readily be effected.

I claim:

1. As a new combination, a first body of material of the nature of a sheet of self-adhering, self-clinging limp plastic film adapted for use as a covering or wrapping and a second body of sheet material substantially completely overlying one side of the first body and having a number of parallel creases in one dimension providing linear air pocket areas which facilitate the separation of the two bodies one from the other, wherein said parallel creases are characterized by pleats and wherein said second body has edge portions inturned over adjacent edges of the first body to maintain the bodies separately coupled together.

2. The combination of claim 1 wherein said inturned edge portions are substantially rectangular in shape.

3. The combination of claim 1 wherein said inturned edge portions are substantially triangular in shape.

4. The combination of claim 1 wherein said inturned edge portions are substantially wider than said first body and extend beyond the adjacent edges of said first body.

5. A laminated sheet of wrapping material, consisting of limp, self-adhering and self-clinging plastic film, devoid of adhesive by which to adhere to another surface and a length of protective sheet material of relative stiffness as compared to said limp plastic film, said plastic film being plane, said protective sheet having a greater width than the said film and completely covering one side of the film with a marginal edge portion projecting beyond the adjacent marginal edge portion of the film, said protective sheet having a freely openable pleat extending lengthwise thereof, the said film and protective sheet being adhered one to the other solely by the adhering and self-clinging facility of the film whereby both the film and protective sheet are applicable as a unit to a body and when so applied, with the film between the body and the protective sheet, the protective sheet when subjected to pulling stress applied adjacent to the marginal edge thereof in a direction transversely of said pleat and in the portion thereof between the pleat and the said marginal edge, will have the pleat opened and become freely separable from the film to leave the film clinging to the body.

6. The laminated sheet of claim 5, wherein said protective sheet includes a pair of oppositely folded pleats each lying adjacent to a marginal edge of the sheet.

7. The laminated sheet of claim 6, with the pleats lying between the film and the portion of the sheet between the spaced pleats whereby said portion of the sheet will be elevated from the film when the marginal edges of the sheets are subjected to said pulling stress.

8. The combination with a dispensing carton, of a roll of laminated sheet wrapping material disposed in said dispensing carton and arranged to have a leading edge drawn out of said carton for severing in selective lengths, and consisting of a length of limp, self-adhering and self-clinging plastic film devoid of adhesive by which to adhere to another surface and a length of protective sheet material of relative stiffness as compared to said limp plastic film, said plastic film being plane, said protective sheet having a greater width than the said film and completely covering one side of the film with marginal edge portions projecting beyond the adjacent marginal edge portions of the film, said protective sheet having freely openable oppositely folded pleats extending lengthwise thereof and lying adjacent to the said marginal edge portions thereof, said film and protective sheet being adhered one to the other solely by the adhering and self-clinging facility of the film whereby both the film and the protective sheet, in a selected length of the lamination, are applicable as a unit to a body and when so applied, with the film between the body and the protective sheet, the protective sheet when subjected to pulling stress adjacent to the marginal edges thereof in a direction transversely of said pleats and in the portions thereof between the pleats and the said marginal edges, will have the pleats opened and become freely separable from the film to leave the film clinging to the body.

References Cited in the file of this patent

UNITED STATES PATENTS

| | | |
|---|---|---|
| 1,956,579 | Hallander et al. | May 1, 1934 |
| 2,145,755 | Dickson | Jan. 31, 1939 |
| 2,194,220 | Elder | Mar. 19, 1940 |
| 2,491,281 | Rowe | Dec. 13, 1949 |
| 2,502,749 | Reid | Apr. 4, 1950 |
| 2,608,503 | Meyer | Aug. 26, 1952 |
| 2,705,104 | Vogt | Mar. 29, 1955 |
| 2,711,382 | Johannsen | June 21, 1955 |
| 2,716,407 | Glickman | Aug. 30, 1955 |
| 2,782,914 | Giles | Feb. 26, 1957 |
| 2,836,293 | Giles | May 27, 1958 |
| 2,848,104 | Schor et al. | Aug. 19, 1958 |
| 2,857,047 | Edelson | Oct. 21, 1958 |

FOREIGN PATENTS

| | | |
|---|---|---|
| 775,377 | Great Britain | May 27, 1957 |